United States Patent
Cañas et al.

(10) Patent No.: US 10,244,112 B2
(45) Date of Patent: Mar. 26, 2019

(54) PRIORITISING CALLS

(71) Applicant: METASWITCH NETWORKS LTD, Enfield (GB)

(72) Inventors: Jorge Cañas, Enfield (GB); Richard Hewitt, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 15/693,206

(22) Filed: Aug. 31, 2017

(65) Prior Publication Data

US 2019/0068785 A1    Feb. 28, 2019

(51) Int. Cl.
  *H04M 3/51*      (2006.01)
  *H04L 29/06*     (2006.01)
  *H04M 3/42*      (2006.01)
  *H04M 3/436*     (2006.01)

(52) U.S. Cl.
  CPC .......... *H04M 3/5116* (2013.01); *H04L 69/18* (2013.01); *H04M 3/42102* (2013.01); *H04M 3/4365* (2013.01); *H04L 65/1006* (2013.01); *H04L 65/1016* (2013.01); *H04L 65/1033* (2013.01); *H04L 65/1069* (2013.01); *H04L 65/1073* (2013.01); *H04L 65/608* (2013.01)

(58) Field of Classification Search
  CPC ................................................ H04L 29/12594
  USPC .................................................... 455/404.01
  See application file for complete search history.

(56) References Cited

U.S. PATENT DOCUMENTS

| | | | |
|---|---|---|---|
| 8,615,605 B2 | 12/2013 | Yu et al. | |
| 9,332,041 B2* | 5/2016 | Bakker | H04W 4/90 |
| 9,503,577 B1* | 11/2016 | Bendi | H04W 4/90 |
| 2002/0111159 A1 | 8/2002 | Faccin et al. | |
| 2004/0203572 A1* | 10/2004 | Aerrabotu | H04W 4/90 |
| | | | 455/404.1 |

(Continued)

FOREIGN PATENT DOCUMENTS

EP      1610583 B1    8/2009

OTHER PUBLICATIONS

Universal Mobile Telecommunications System (UMTS); LTE; IP Multimedia Subsystem (IMS) emergency sessions ETSI TS 123 167 V9.6.0 (Mar. 2011) (3GPP TS 23.167 version 9.6.0 Release 9).

(Continued)

*Primary Examiner* — Maria El-Zoobi
(74) *Attorney, Agent, or Firm* — EIP US LLP

(57) ABSTRACT

A network function operable in a communication network, in which the network function is configured to receive a call setup request from an emergency service to set up a call between the emergency service and a user terminal, the received call setup request comprising a called party identifier. The network function determines whether the called party identifier is of a first type or of a second, different type, wherein the first type of called party identifier comprises a dialable number temporarily associated with the user terminal for use in receiving a call from the emergency service. In response to determining that the called party identifier is of the first type, the network function transmits priority indication data to a further network function in the communication network in order to cause the further network function to prioritize handling of the call between the emergency service and the user terminal.

17 Claims, 4 Drawing Sheets

(56) References Cited

U.S. PATENT DOCUMENTS

| | | | |
|---|---|---|---|
| 2007/0054663 A1* | 3/2007 | Goldman | H04W 8/06 |
| | | | 455/432.1 |
| 2008/0063153 A1 | 3/2008 | Krivorot et al. | |
| 2008/0089486 A1 | 4/2008 | Madour et al. | |
| 2008/0139166 A1* | 6/2008 | Agarwal | H04W 4/02 |
| | | | 455/404.1 |
| 2009/0253399 A1 | 10/2009 | Snapp | |
| 2009/0280770 A1* | 11/2009 | Mahendran | H04L 29/12594 |
| | | | 455/404.1 |
| 2016/0020804 A1* | 1/2016 | Lee | H04B 1/3816 |
| | | | 455/558 |
| 2017/0142256 A1* | 5/2017 | Bjorsell | H04M 7/006 |
| 2017/0366954 A1* | 12/2017 | Sabeur | H04W 4/90 |

OTHER PUBLICATIONS

Digital cellular telecommunications system (Phase 2+); Universal Mobile Telecommunications System (UMTS); LTE; IP Multimedia Subsystem (IMS); Stage 2 ETSI TS 123 228 V11.10.0 (Dec. 2013) (3GPP TS 23.228 version 11.10.0 Release 11).

Digital cellular telecommunications system (Phase 2+); Universal Mobile Telecommunications System (UMTS); LTE; IP multimedia call control protocol based on Session Initiation Protocol (SIP) and Session Description Protocol (SDP); Stage 3 ETSI TS 124 229 V12.6.0 (Oct. 2014) (3GPP TS 24.229 version 12.6.0 Release 12).

United Kingdom search report dated Jan. 21, 2019 on related Application No. GB1814078.0 filed Aug. 30, 2018.

* cited by examiner

PRIORITISING CALLS

BACKGROUND OF THE INVENTION

Field of the Invention

The present disclosure relates to prioritizing calls. In particular, but not exclusively, it relates to network functions, methods, computer programs, Emergency Call Session Control Functions (E-CSCF), communications networks and Session Initiation Protocol (SIP) gateways useable in prioritizing calls.

Description of the Related Technology

In a communications network, for example an IP Multimedia Subsystem (IMS) network, a user (also referred to as a subscriber) registers a user terminal in order to be able to receive service therefrom. In case of an IMS network, the user terminal registers with a Serving Call Session Control Function (S-CSCF) to receive service. After registration, all service set up requests, including requests to set up calls, in respect of the user terminal are directed to the S-CSCF it is registered with.

The 3rd Generation Partnership Project (3GPP) Technical Specifications TS 24.229 and TS 23.167 stipulate that when an emergency call is made to an emergency service (also known as a 'Public Safety Access Point' (PSAP)), special procedures are applied to allow the call to be prioritized in the IMS network. The user terminal typically places an emergency call by dialing 911 (in North America), 999 (in the United Kingdom) or some other emergency-specific number. A request from the user terminal to set up the emergency call is directed to an Emergency-CSCF (E-CSCF) within the IMS network, instead of the S-CSCF. The E-CSCF is configured to handle requests from the user terminal to establish an emergency call with the PSAP.

There are situations where the emergency call between the PSAP and the user terminal may be terminated, intentionally or unintentionally. For example, the emergency call may be terminated inadvertently by the user, or the call may be dropped due to poor radio conditions experienced by the user terminal. In such situations, the PSAP may call back the user terminal. Calls placed by the PSAP are considered to be emergency calls if they include a Priority header field with a "psap-callback" value in a SIP INVITE request message (i.e. call setup signaling). In the event that the PSAP call back is routed via a legacy network that does not allow such a field to be included in the call setup signaling, then the IMS network will fail to identify the call as an emergency call. Calls placed by the PSAP that do not include the above field in the call setup signaling are not considered as emergency calls, and are processed in accordance with call handling procedures for a non-emergency call. This being the case, unlike prioritized handling of calls involving the PSAP that are placed by the user terminal, which is standards-mandated, there is no standards-mandated prioritized handling of calls placed by the PSAP that do not include an explicit indication in the call setup signaling identifying the call as an emergency call.

It is desirable to enable calls and call backs involving the PSAP that do not include an explicit indication to be prioritized.

SUMMARY

In a first embodiment, there is provided a network function operable in a communications network, the network function being configured to: receive a call setup request from an emergency service to set up a call between the emergency service and a user terminal, the received call setup request comprising a called party identifier; determine whether the called party identifier is of a first type or of a second, different type, wherein the first type of called party identifier comprises a dialable number temporarily associated with the user terminal for use in receiving a call from the emergency service; and in response to determining that the called party identifier is of the first type, transmit priority indication data to a further network function in the communications network in order to cause the further network function to prioritize handling of the call between the emergency service and the user terminal.

In a second embodiment, there is provided a method of controlling a network function in a communications network, the method comprising, at the network function: receiving a call setup request from an emergency service to set up a call between the emergency service and a user terminal, the received call setup request comprising a called party identifier; determining whether the called party identifier is of a first type or of a second, different type, wherein the first type of called party identifier comprises a dialable number temporarily associated with the user terminal for use in receiving a call from the emergency service; and in response to determining that the called party identifier is of the first type, transmitting priority indication data to a further network function in the communications network in order to cause the further network function to prioritize handling of the call between the emergency service and the user terminal.

In a third embodiment, there is provided a computer program comprising a set of instructions, which, when executed by a network function, cause the network function to perform a method in a communications network, the method comprising, at the network function: receiving a call setup request from an emergency service to set up a call between the emergency service and a user terminal, the received call setup request comprising a called party identifier; determining whether the called party identifier is of a first type or of a second, different type, wherein the first type of called party identifier comprises a dialable number temporarily associated with the user terminal for use in receiving a call from the emergency service; and in response to determining that the called party identifier is of the first type, transmitting priority indication data to a further network function in the communications network in order to cause the further network function to prioritize handling of the call between the emergency service and the user terminal.

In a fourth embodiment, there is provided an emergency call session control function (E-CSCF), operable in a communications network, the E-CSCF being configured to: receive priority indication data in relation to a call setup request, wherein the call setup request is from an emergency service to set up a call from the emergency service to a user terminal; and responsive to receipt of the priority indication data, prioritize handling of the call from the emergency service to the user terminal.

In a fifth embodiment, there is provided a method of controlling an emergency call session control function (E-CSCF), in a communications network, the method comprising: receiving priority indication data in relation to a call setup request, wherein the call setup request is from an emergency service to set up a call from the emergency service to a user terminal; and responsive to receipt of the priority indication data, prioritizing handling of the call from the emergency service to the user terminal.

In a sixth embodiment, there is provided a network function in a communications network configured to: receive call setup signaling from an emergency service, the call setup signaling comprising a called party identifier; determine at least in part based on the called party identifier whether the received call setup signaling relates to a call from the emergency service to the user terminal; and based on the determination, selectively including priority indication data in outgoing call setup signaling in relation to the call, whereby to cause the call to be prioritized in the communications network.

In a seventh embodiment, there is provided a communications network configured to: receive call setup signaling from an emergency service, the call setup signaling comprising a called party identifier; determine at least in part based on the called party identifier whether the received call setup signaling relates to an emergency call; and prioritize handling of the call based at least in part on the determination.

In an eighth embodiment, there is provided a method of controlling a SIP gateway, the method comprising: receive call setup signaling from an emergency service, the call setup signaling comprising a called party identifier; determine whether the received call setup signaling is an emergency or a non-emergency call at least in part on the basis of the called party identifier; and prioritize handling of the call based at least in part on the determination.

In a ninth embodiment, there is provided a method of controlling an emergency call session control function (E-CSCF), in a communications network, the method comprising: receiving a session initiation protocol (SIP), invite message to set up a call between a user terminal and an emergency service, the SIP invite message comprising data identifying the call as a callback from the emergency service; and prioritizing handling of the call between the emergency service and the user terminal responsive to receipt of the SIP invite message.

In a tenth embodiment, there is provided an emergency call session control function (E-CSCF), operable in a communications network, the E-CSCF being configured to: receive a session initiation protocol (SIP), invite message to set up a call between a user terminal and an emergency service, the SIP invite message comprising data identifying the call as a callback from the emergency service; and prioritize handling of the call between the emergency service and the user terminal responsive to receipt of the SIP invite message.

Further features will become apparent from the following description of embodiments, given by way of example only, which is made with reference to the accompanying drawings.

DETAILED DESCRIPTION OF CERTAIN INVENTIVE EMBODIMENTS

Figure 1:
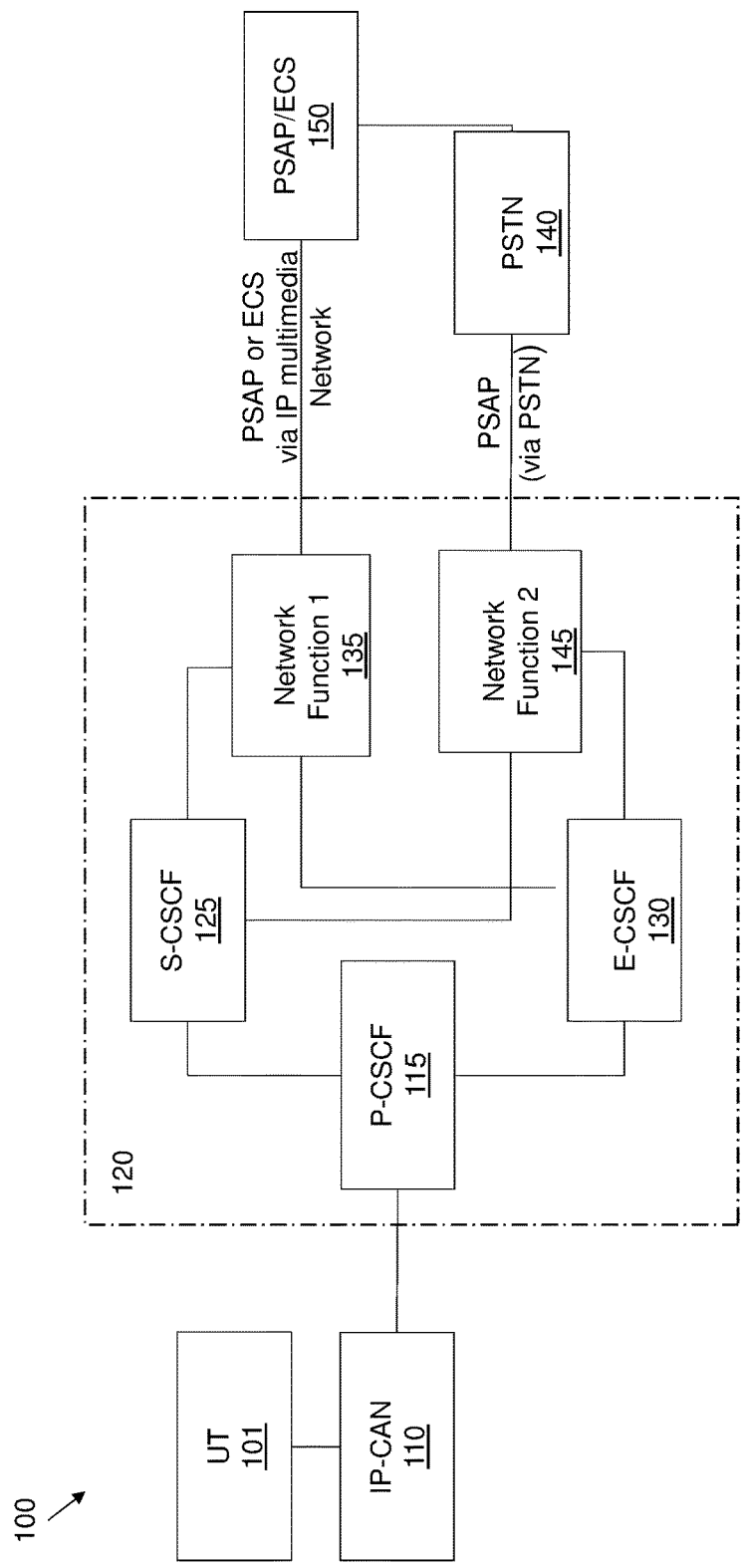
FIG. 1 shows a schematic block diagram of an example of a telecommunications network in accordance with embodiments.

Referring to FIG. 1, there is shown schematically an example of a communications network 100 comprising a framework for delivering IP multimedia services. The communications network 100 comprises a number of systems. The term "system" is used herein to denote an entity (or entities) in the communications network 100. A system may be embodied in the form of apparatus, hardware, software, a network function, a virtualized resource, a node etc.

In this example, the communications network 100 comprises an IMS network 120 to provide IP multimedia services to a user terminal (UT) 101. The communications network additionally comprises an Internet Protocol Connectivity Access Network (IP-CAN) 110, a Public Switched Telephone Network (PSTN) 140 and a PSAP (emergency service) 150. A communications network can comprise at least some different and/or additional components to those shown in FIG. 1.

The user terminal 101, which is associated with a user, accesses the IMS network 120 via the IP-CAN 110. The user terminal 101 may comprise an endpoint device, for example a Session Initiation Protocol (SIP) telephone, a mobile telephone, a tablet computer, a personal computer, etc. The user terminal 101 may comprise one or more processors (not shown) for performing various data processing operations according to embodiments and/or one or more memories (not shown) for storing various data according to embodiments.

The IP-CAN 110 may, for example, be a wireless access network. Examples of wireless access networks include, but are not limited to, Wireless Local Area Networks (WLANs) and mobile radio access networks. An example of a mobile radio access network is an Evolved Universal Terrestrial Radio Access Network (E-UTRAN). The user terminal 101 may need to register with the IP-CAN 110 in order to be allocated an IP address, and thereafter the user terminal 101 may register with the IMS network 120.

The IMS network 120 comprises a number of systems. In this specific example, the systems are network functions (virtualized resources) and are implemented on the same node (physical resource) as each other. However, the systems could be implemented in other ways, such as on one or more separate nodes. Known network node products, such as Metaswitch's™ Perimeta™ Session Border Controller (SBC), support implementation of one or more network functions, such as an E-CSCF. In this example, the IMS network 120 comprises a Proxy-CSCF (P-CSCF) network function 115, an E-CSCF network function 130, an S-CSCF network function 125, a first network function 135 (denoted as "Network Function 1" in FIG. 1) and a second network function 145 (denoted as "Network Function 2" in FIG. 1). An IMS network can comprise at least some different and/or additional network functions (or, more generally, systems) to those shown in FIG. 1.

The PSAP 150 may, for example, be a central or location-specific control room or call center. Connectivity between the PSAP 150 and the IMS network 120 may be via an emergency call server (ECS) that may be internal or external to the IMS network 120.

The user terminal 101 accesses the IMS network 120 through the P-CSCF 115. The P-CSCF 115 serves as a proxy for signaling between the user terminal 101 and other parts of the IMS network 120. The P-CSCF 115 may be located in the home network of the user or may be located in a visited network. The user terminal 101 registers with the IMS network 120 in order to receive services, such as calls. The user terminal 101 registers with the IMS network 120 by sending a SIP register request message. In response to receiving the SIP register request message, the IMS network 120 associates the user terminal 101 with an S-CSCF, such as the S-CSCF 125, and forms an association between a SIP Uniform Resource Identifier (URI) associated with the user and the IP address associated with the user terminal 101. In practice, registration of the user may involve, for example, authentication and authorization checks, but details of the registration are omitted for brevity and convenience. After registration, the user terminal 101 can access services provided via the IMS network 120, such as calls. After registration, all requests to set up a service, including terminal-originated and terminal-terminated, in respect of the user terminal 101 are handled by the S-CSCF 125.

If the user terminal 101 is authorized to use the IMS network 120 but is not registered, then the user terminal 101 registers with the IMS network 120 before placing an emergency call. However, if the user terminal 101 is not authorized to use the IMS network 120, then in order to place an emergency call via the IMS network 120 the user terminal 101 performs an emergency registration, which allows the user terminal 101 limited access to the IMS network 120 for the purpose of making emergency calls. The emergency registration provides the user terminal 101 with a SIP URI, and associates the SIP URI with the IP address of the user terminal 101. Subsequent to the emergency registration, the user terminal 101 may place an emergency call via the IMS network 120.

The first network function 135 and/or the second network function 145 may act as a gateway between the IMS network 120 and other networks. The first network function 135 and/or the second network function 145 may comprise a SIP gateway configured to interface with other networks configured to use same or different communication protocols.

The first network function 135 acts as an interface between the IMS network 120 and services provided by the IMS network 120 and/or other IMS/IP networks. The first network function 135 may, for example, be configured on a layer 2 or layer 3 device, such as a switch or a router that routes communication within the IMS network 120, on a gateway that connects the IMS network 120 with other IMS/IP networks and/or on a server within the IMS network 120.

The second network function 145 acts as an interface between the IMS network 120 and the PSTN 140. The second network function 145 may, for example, translate communication between the SIP over IP signaling protocol used in the IMS network 120 and another signaling protocol, such as Signaling System No. 7 (SS7), used in the PSTN 140. The second network function 145 may additionally or alternatively convert between the Real-time Transport Protocol (RTP) media protocol used in the IMS network 120 and another media protocol, such as Pulse-code modulation (PCM), used in the PSTN 140.

The first network function 135 and/or the second network function 145 are implemented on a computer-implemented system (not shown) comprising one or more processors (not shown) for performing various data processing operations according to embodiments. The first computer-implemented system comprise or otherwise have access to a database (not shown) for storing various data according to embodiments. The database may comprise one or more memories (not shown) and may be integral to or external to the computer-implemented system. The database may comprise memory within the computer-implemented system (not shown) which is available for storing call setup processing data. The memory may be volatile so that data stored therein may need to be re-learnt upon failure/re-boot of the computer-implemented system.

Figure 2:
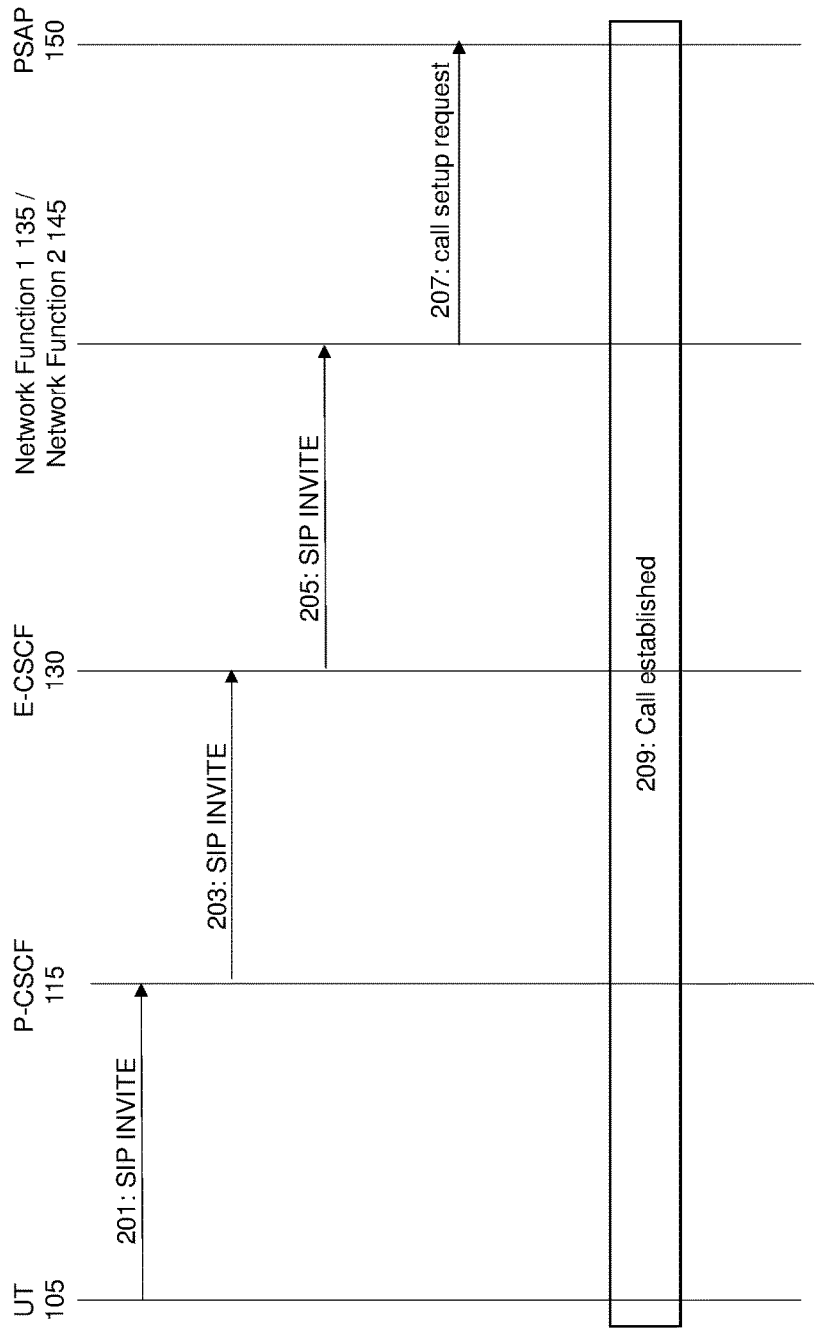
FIG. 2 shows a flow diagram depicting an example of processing of data.

Referring to FIG. 2, there is shown an example of handling of an emergency call originating at the user terminal 101. This example is performed in the IMS network 120 described above with reference to FIG. 1.

The example depicted in FIG. 2 may correspond to a known call handling flow in relation to calls originating at the user terminal 101 and involving the emergency service. The user terminal 101 initiates an emergency call setup by transmitting a call setup request (i.e. call setup signaling), such as a SIP INVITE request message, comprising a URI corresponding to the emergency service to the P-CSCF (item 201).

The SIP INVITE request message is received by the P-CSCF 115, which determines that the SIP INVITE request message corresponds to an emergency call on the basis of the URI corresponding to the emergency service included the SIP INVITE request message. In response to the determination, the P-CSCF 115 transmits the SIP INVITE request message to the E-CSCF 130, instead of the S-CSCF 125 (item 203).

The E-CSCF 130 then has two routing options depending on the location of the PSAP 150. If the PSAP URI is a SIP URI, then this indicates that the PSAP 150 is connected to the IMS network 120 or another IMS/IP network. In this case, the E-CSCF 130 routes the SIP INVITE request message on the basis of the SIP URI to the PSAP 150 via, for example, one or more intermediate nodes or network functions, such as the first network function 135 (item 205).

However, if the PSAP URI is a TEL URI, i.e. a URI that comprises data indicative of a dialable telephone number, such as an E.164 format telephone number, then this indicates that the PSAP 150 is accessible via the PSTN 140. The dialable number may comprise an identifier that is routable via the PSTN 140. In this case, the E-CSCF 130 forwards the SIP INVITE request message to the second network function 145 (item 205), which may then translate the SIP INVITE request message in accordance with a signaling protocol used in the PSTN 140 and transmit the translated request to the PSAP 150 via the PSTN 140 (item 207). Thereafter, an emergency call may be established between the PSAP 150 and the user terminal 101 in accordance with known call establishment procedures (item 209).

There are situations where the emergency call between the PSAP 150 and the user terminal 101 may be terminated, intentionally or unintentionally. In such situations, the PSAP 150 may want to call back the user terminal 101. Alternatively, the PSAP 150 may want to call the user terminal 150 in response to a request from the user terminal 101 via, for example, a software application (or 'app') on the user terminal 101. The call or call back from the PSAP 150 may not be considered an emergency call within the IMS network 120. This is because a call placed by the PSAP 150 is only considered to be an emergency call if the call setup signaling includes a Priority header field with a "psap-callback" value in the SIP INVITE request message. In the event that a call or call back from the PSAP does not include this header field or is routed via a legacy network that does not allow this header field to be included in the call setup signaling, then the IMS network 120 may not recognize the call as an emergency call. A call or call back from the PSAP 150 that is not identified as an emergency call is subject to call handling procedures applicable to a non-emergency incoming call, and is directed to the S-CSCF 125 for forwarding to the user terminal 101 via the P-CSCF 115. For example, establishment of a call between the PSAP 150 and the user terminal 101, when roaming, may involve querying a home network associated with the user terminal 101, which will add to delays. Such delays may, in extreme cases, lead to call requests being dropped, which is not desirable.

Figure 3:
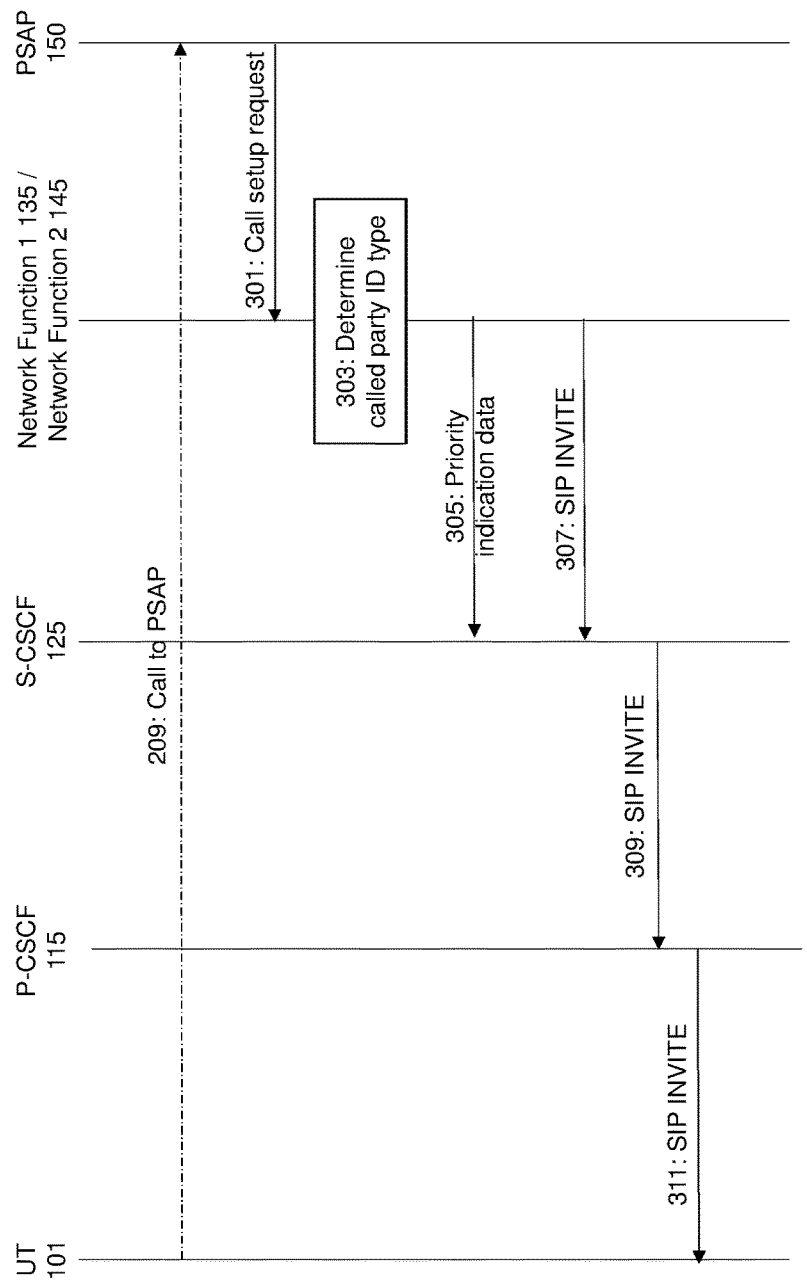
FIG. 3 shows a flow diagram depicting an example of processing data in accordance with embodiments.

Referring to FIG. 3, there is shown an example of processing a call setup request in accordance with embodiments. The example may be performed in the IMS network 120 described above with reference to FIG. 1. The example depicted in FIG. 3 may correspond to an IMS flow relating to handling of a call setup request from the PSAP 150 to set up a call between the PSAP 150 and the user terminal 101.

At item 301, the first network function 135 or the second network function 145 receive a call setup request from the PSAP 150 to set up a call between the PSAP 150 and the user terminal 101. Call setup requests received via the PSTN 140 may be received by the second network function 145 that acts as an interface therewith, and call setup requests received via other IMS/IP networks may be received via the first network function 135. The received call setup request comprises a called party identifier associated with the user terminal 101. The called party identifier may, for example, comprise a telephone number, an IP address, a dialable number and/or a SIP URI associated with the user terminal 101.

For example, the PSAP 150 may transmit the call setup request in response to a terminated call from the user terminal 101 (i.e. call back from the PSAP 150 to the user terminal 101), or may transmit the call setup request in response to a request from the user of the user terminal 101 via, for example, a software application (app) on the user terminal 101.

The first network function 135 or the second network function 145 (as appropriate) may then determine whether the called party identifier is of a first type or of a second, different type (item 303). The called party identifier of the first type comprises a dialable number temporarily associated with the user terminal 101 for use in receiving a call from the PSAP 150. The dialable number may comprise an E.164 format telephone number, which may be temporarily associated with the user terminal 101 by the E-CSCF 130 in response to a call setup request therefrom to set up a call with the PSAP 150, for example item 201 of FIG. 2.

In response to determining that the called party identifier is of the first type, the first network function 135 or the second network function 145 (as appropriate) transmits priority indication data to a further network function in the IMS network 120 in order to cause the further network function to prioritize handling of the call between the PSAP 150 and the user terminal 101 (item 305). In this example, the further network function comprises the S-CSCF 125. The further network function could, however, comprise the E-CSCF 130. The prioritized handling may, for example, comprise routing the call via prioritized trunks reserved for emergency calls.

Therefore, the first network function 135 or the second network function 145 (as appropriate) determines which of the incoming call setup requests relate to emergency calls based on the called party identifier, and if the incoming call setup request comprises a called party identifier of the first type then the call is considered to be an emergency call. As a consequence of the determination, the first network function 135 or the second network function 145 (as appropriate) causes handling of the call to be prioritized in the IMS network 120 by transmitting priority indication data. Embodiments, therefore, provide a mechanism for entities in the IMS network 120 to identify which of the incoming call setup requests relate to emergency calls, and allow for these to be handled with priority in the IMS network 120.

In known systems, emergency calls are either identified on the basis of the aforementioned Priority header field with a "psap-callback" value or on the basis of a calling party identifier. However, both of these options are undesirable as will now be explained. The former option, i.e. identifying emergency calls on the basis of the Priority header field with a "psap-callback" value, may fail to identify emergency calls from call setup signaling that does not include this header field or from call setup signaling that is routed via a legacy network that does not allow this header field to be included in the call setup signaling. As regards the latter option, i.e. identifying emergency calls on the basis of a calling party identifier, this option may identify a non-emergency call placed by the PSAP 150. An example of a non-emergency call placed by the PSAP 150 may be a personal call.

The priority indication data is indicative of a request to prioritize the associated call. The priority indication data may additionally or alternatively identify the associated call as an emergency call. The priority indication data may, for example, comprise data indicating that the corresponding call setup request relates to a PSAP call back, such as a Priority header field with a "psap-callback" value, data indicative of an emergency flag and/or data indicative of a priority flag.

In embodiments, the received call setup request does not comprise the priority indication data. In this case, the priority indication data is selectively generated at the first network function 135 or the second network function 145 (as appropriate) on the basis of the aforementioned determination (e.g. item 303 in FIG. 3). This is particularly the case if the request is received via legacy networks that lack the capability to allow inclusion of priority indication data in call setup requests.

The received call setup request (e.g. item 301 in FIG. 3) may be in accordance with a first protocol that does not allow the priority indication data to be comprised in the received call setup request. The first protocol may, for example, be (Primary Rate Interface Integrated Services Digital Network (PRI-ISDN), Integrated Services Digital Network User Part (ISUP) or Multi-Frequency (MF).

The first protocol may be used to set up calls involving the PSTN 140. In this case, the call setup request would be received by the second network function 145 from the PSAP 150 via the PSTN 140. Legacy protocols used on the PSTN 140 may not allow the priority indication data to be included in call setup requests, and as a consequence handling of call setup requests relating to emergency calls in accordance with legacy protocols may not be prioritized, which is undesirable.

The second network function 145 may transmit a call setup request (e.g. item 307 in FIG. 3) in accordance with a second, different, protocol. The transmitted call setup request may be based on the received call setup request. The second protocol may, for example, be SIP. In this case, the transmitted call setup request may be a SIP INVITE request message, as denoted at item 307 of FIG. 3. The transmitted call setup message may comprise the called party identifier and/or the priority indication data.

As described above, the first network function 135 and/or the second network function 145 may comprise a signaling gateway, a media gateway and/or an emergency call server (ECS). The second network function 145 may additionally or alternatively comprise an IP Private Branch Exchange (IP-PBX), a media gateway control function (MGCF) and/or a breakout gateway control function (BGCF) to enable the second network function 145 to interface with the PSTN 140. If the first network function 135 and/or the second network function 145 acts as an interface between two different carriers, then they may additionally or alternatively comprise a Point of Interface (POI).

The first network function 135 and the second network function 145 may additionally or alternatively be different from the various CSCF entities in the IMS network 120. Specifically, the first network function 135 and the second network function 145 may not comprise any of an E-CSCF, a P-CSCF, an S-CSCF and an I-CSCF. This being the case, the determination at item 303 is performed at a network function other than the network functions configured to control establishment and handling of calls involving the user terminal 101.

In accordance with the example shown with reference to FIG. 3, the first network function 135 or the second network function 145 (as appropriate) transmits the SIP INVITE request message based on the received call setup request message for receipt by the S-CSCF 125 at item 307. The S-CSCF 125 prioritizes handling of the call based on the priority indication data. The S-CSCF 125 processes the SIP INVITE request message, and transmits a SIP INVITE request message for receipt by the user terminal 101 on the basis of the IP address associated therewith via the P-CSCF 115 (items 309 and 311), whereby causing a call to be established between the PSAP 150 and the user terminal 101.

Figure 4:
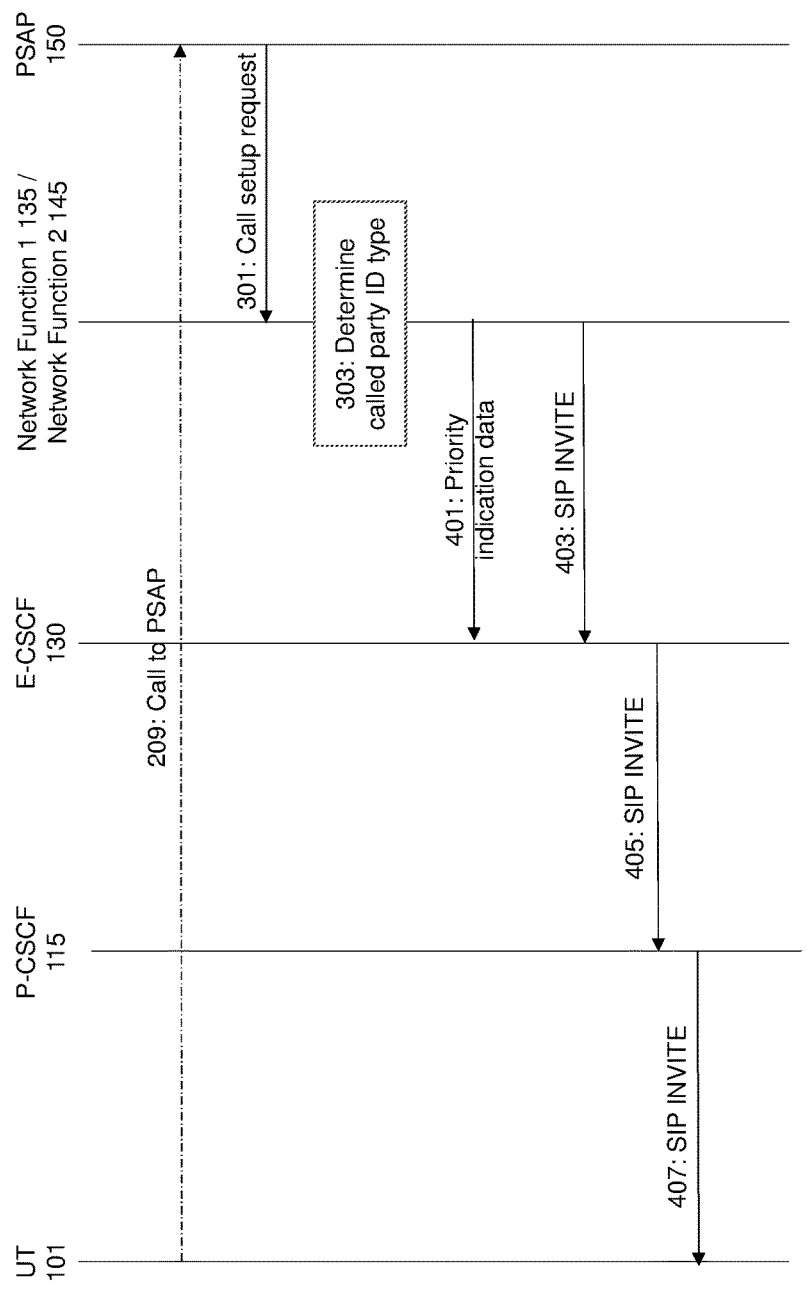
FIG. 4 shows a flow diagram depicting another example of processing data in accordance with embodiments.

In alternative embodiments, referring to FIG. 4, the first network function 135 or the second network function 145 (as appropriate), in response to the determination at item 303, transmits the priority indication data and/or the SIP INVITE request message for receipt by the E-CSCF 130 (items 401 and 403). The E-CSCF 130 then processes the SIP INVITE request message and transmits a SIP INVITE request message on the basis of the IP address associated with the user terminal 101 for receipt by the user terminal 101 via the P-CSCF 115 (items 405 and 407), whereby causing a call to be established between the PSAP 150 and the user terminal 101.

In alternative embodiments, the further network function (to which the priority indication data is transmitted) is a network function, different from the E-CSCF 130 and the S-CSCF 125, in the IMS network 120. The further network function may, for example, be the I-CSCF or the P-CSCF 115.

In embodiments, the priority indication data causes the further network function, which could, for example, be the S-CSCF 125 or the E-CSCF 130, when prioritizing the handling of the call between the PSAP 150 and the user terminal 101, to circumvent one or more checks that are performed when processing call setup requests. Specifically, the further network function may circumvent: verifying an authentication state of the user terminal; verifying an authorization state of the user terminal; verifying a registration state of the user terminal; verifying whether or not a supplementary service is configured for the user terminal; and/or verifying credit and billing information associated with the user terminal. It is known to circumvent one or more of the above checks in respect of calls involving the PSAP 150 that originate at the user terminal 101. However, call setup requests transmitted the PSAP 150 are conventionally subject to checks that are performed in respect of a non-emergency incoming call, which adds to delays. The embodiments therefore enable calls involving the PSAP 150 to be established with minimal additional delays.

In embodiments, the association between the user terminal 101 and the called party identifier of the first type is on the basis of: a time period; an authorization state associated with the user terminal 101; and/or an association between the user terminal 101 and a radio access network. For example, the association may be for a predetermined time period, and following expiry of the predetermined time period the association ceases to exist. In this case, if a request to set up a call between the PSAP 150 and the user terminal 101 is received by the IMS network 120 before expiry of the predetermined period, then duration of the predetermined time period may be extended. In other examples, the association ceases to exist in response to a change in the authorization state associated with the user terminal as a result of: a non-emergency call placed by the user terminal 101; a de-registration request received from the user terminal 101; and/or a request from the user terminal 101 to perform non-emergency registration in the event that the user terminal 101 had previously performed emergency registration in the IMS network 120.

In embodiments, the dialable number is from a pool of dialable numbers reserved for calls involving the PSAP 150. The pool of dialable numbers comprises one or more dialable numbers that are set aside for calls involving the PSAP 150. Calls involving the PSAP 150 are calls that either placed by the PSAP 150 to the user terminal 101, or calls that placed by the user terminal 101 to the PSAP 150. In examples, the E-CSCF 130 may allocate the dialable number temporarily to the user terminal 101 from a pool of numbers that are reserved for calls involving emergency services (e.g. the PSAP 150). Network functions within the IMS network 120, such as the first network function 135 and/or the second network function 145, may be configured to route calls and call setup requests in respect of the dialable numbers to a network function within the IMS network 120, such as the S-CSCF 125 or the E-CSCF 130, configured to handle communication in respect of these dialable numbers. Network function external to the IMS network 120 may be configured to direct communication to a gateway network function thereof, which could, for example, be the first network function 135 and/or the second network function 145.

The dialable number may, for example, comprise a public service identity (PSI) from a pool of PSIs reserved for calls involving emergency services (e.g. the PSAP 150). The pool of PSIs may, for example, correspond to a wild-carded range of PSIs. In the event that the dialable number comprises a PSI, network functions within the IMS network 120 are configured to route calls and call setup requests in respect of the PSI or the wild-carded range of PSIs to a network function, such as the E-CSCF 130 or the S-CSCF 125, configured to handle incoming emergency calls in respect of the user terminal 101. Network functions external to the IMS network 120 may be configured to direct communication in respect of the PSI or the wild-carded range of PSIs to a gateway network function of the IMS network 120, which could, for example, be the first network function 135 and/or the second network function 145.

The dialable number may be from a pool of dialable numbers reserved for calls involving user terminals without credentials. For example, the dialable number may be temporarily allocated to the user terminal 101 by the E-CSCF 130 if user terminal 101 is determined to be without credentials. User terminals without credentials are terminals that are not authorized to use the IMS network 120, and have been granted limited access solely for the purpose of emergency calls involving the PSAP 150. User terminals without credentials may include mobile phones without a Subscriber Identify Module (SIM) card and/or a user terminal associated with a roaming subscriber who does not have a roaming arrangement with their home network.

The dialable number may additionally or alternatively be allocated from a pool of numbers reserved for calls involving user terminals with credentials. The user terminals with credentials are terminals that are authorized to use the IMS network 120 and are registered therewith. A user terminal with credentials may have an associated call back number, such as an E.164 telephone number. For example, the dialable number may be temporarily allocated to the user terminal 101 by the E-CSCF 130 if user terminal 101 is determined to be with credentials. In this case, if the dialable number is allocated to the user terminal 101 by the E-CSCF 130 in response to receiving the SIP INVITE request message from the user terminal 101 to set up a call with the PSAP 150 (e.g. item 203 in FIG. 2), the E-CSCF 130 may include the dialable number in the SIP INVITE request message transmitted for receipt by the PSAP 150 via the first network function 135 or the second network function 145 (as appropriate) (e.g. items 205 and 207 in FIG. 2). The user terminal 101 may have supplementary services, such as call forwarding, configured on the basis of the call back number. In this case, emergency calls may, for example, be forwarded on the basis of the configured supplementary services, and as a consequence the call setup request may not be directed to the user terminal 101. The E-CSCF 130 may, for example, cause the network functions in the IMS network 120 to circumvent checks in relation to configured supplementary services by including the temporary dialable number allocated to the user terminal 101 as a calling party identifier in the call setup request transmitted to the PSAP 150 (e.g. items 205 and 207 in FIG. 2), thereby causing the PSAP 150 to call back the user terminal 101 on the basis of the temporary dialable number (i.e. the called party identifier of the first type) instead of the call back number associated with the user terminal 101.

In embodiments, in response to determining that the called party identifier is of the second type, the first network function 135 or the second network function 145 (as appropriate) is configured not to transmit the priority indication data in relation to the call. As a consequence, the network functions operate such that non-emergency calls are not prioritized.

In embodiments, the association between the user terminal 101 and the called party identifier of the first type may be maintained in a database remote from the first network function 135 and/or the second network function 145. For example, the database may be maintained at the aforementioned ECS. The first network function 135 and/or the second network function 145 may query the database on the basis of the called party identifier in order to determine whether the called party identifier is of the first type or of the second type. In examples, the first network function 135 and/or the second network function 145 transmit data indicative of all or part of the called party identifier in order to query the database on the basis thereof.

The first network function 135 or the second network function 145 may additionally or alternatively transmit data indicative of a geographical location associated with the user terminal 101 for receipt by the PSAP 150 in response to receipt of the call setup request at item 301 in FIG. 3. The geographical location may, for example, be the location of the user terminal 101, or an entity, such as an access point, in the vicinity thereof. The PSAP 150 may additionally or alternatively transmit data indicative of the geographical location associated with the user terminal 101 in response to a request from the PSAP 150 regarding the same. The first network function 135 or the second network function 145 may, for example, obtain the geographical location associated with the user terminal 101 from a location server in the IMS network 120 and/or a location server in the IP-CAN 101. In known systems, the E-CSCF 130 is configured to transmit data indicative of the geographical location of the user terminal 101 in response to a call setup request from the user terminal 101 to set up a call with the PSAP 150 for use by the PSAP 150 in dealing with the emergency situation. However, data indicative of the geographical location is not provided to the PSAP 150 when the emergency call is initiated by the PSAP 150. This is not desirable because the user terminal 101 could have moved or the earlier call between the PSAP 150 and the user terminal 101 may have been terminated prior to data indicative of the geographical location being transmitted. Therefore, it would be beneficial to provide current geographical location of the user terminal 101 to the PSAP 150.

As described above, an example of the IP-CAN 110 is a mobile radio access network. The mobile radio access network includes a packet network part configured to receive the aforementioned SIP INVITE request message transmitted by the P-CSCF 115 on the basis of the IP address associated with the user terminal 101. The packet network part directs the received SIP INVITE request message to a radio access network (RAN) part of the mobile radio access network for forwarding the received request to the user terminal 101 over a radio interface. The RAN part comprises one or more base stations (or access points), and transmission in the RAN may be based on a radio network identifier, such as a paging identifier, associated with the user terminal 101. The radio network identifier may, for example, be associated with the user terminal 101 when the user terminal 101 registers with the IP-CAN 110. The RAN part may, for example, periodically or in receipt of the SIP INVITE request message, broadcast a notification, based on the radio network identifier, indicative of an incoming call for receipt by the user terminal 101, and responsive to receiving the notification the user terminal 101 may cause the emergency call to be established by exchanging signaling messages via the RAN part of the mobile radio network.

In case the user terminal 101 is a user terminal without credentials, the user terminal 101 may additionally be configured to receive the notification for a preconfigured time period. The preconfigured time period may commence based on one or more of: a request to register by the user terminal 101 with the IP-CAN 110; a request to register by the user terminal 101 with the IMS network 120; and/or a request by the user terminal 101 to establish a call with the PSAP 150. The expiry of the preconfigured time period may, for example, be synchronized with the expiry of the aforementioned predetermined time period.

Therefore, embodiments enable identification of emergency calls that are placed by the PSAP 150 based on the called party identifier, and cause them to be handled with priority. Conventionally, identification of an emergency call placed by the PSAP 150 was based on an explicit indication regarding the same in call setup signaling. However, legacy protocols, especially those used to set up calls involving the PSTN 140, do not allow for such an explicit indication to be included in call setup signaling, and as a consequence it is not possible to identify emergency calls on the basis of call setup requests in accordance with legacy protocols. By contrast, the embodiments enable identification of emergency calls independently of any explicit indication in call setup signaling. Furthermore, call setup signaling in accordance with a legacy protocol may be translated in to a protocol that allows an indication regarding emergency calls to be included, thereby causing these calls to be handled with priority. The identification of the emergency calls may be performed by a network function comprising a gateway, such as a BGCF, and/or by a network function other than the various CSCFs in the IMS network 120.

The embodiments allow emergency calls involving the PSAP 150 and that are placed by the PSAP 150 to be handled based on special procedures. The special procedures may, for example, include causing checks, such as credit and billing, performed in respect of non-emergency calls to be circumvented, thereby allowing these to be processed quicker.

The above are to be understood as illustrative examples. Further examples are envisaged.

In examples described above, the communications network 100 comprises one user terminal 101, one IP-CAN 110, one PSTN 140, one IMS network 120 and one PSAP 150. In other examples, the communications network 100 comprises more than one user terminals and/or additional communications networks.

In examples described above, the IMS network 120 comprises one P-CSCF 115, one S-CSCF 125, one E-CSCF 130 and two network functions 135 and 145. In other examples, the IMS network 120 comprises additional or fewer network functions.

In examples described above, the emergency calls are calls involving the PSAP. In other examples, emergency calls may relate to calls that need to prioritized, for example calls relating to hazard or disaster response.

In examples described above, the emergency call backs are initiated by the PSAP 150. In examples, an emergency call may be initiated by an intermediate node or network function between the user terminal 101 and the PSAP 150.

In examples described above, the IMS network is configured in accordance with the SIP. In other examples, the IMS network may be configured with alternative or additional protocols.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The following numbered clauses set out further exemplary embodiments of the present disclosure:

1. A network function operable in a communication network, the network function being configured to:
receive a call setup request from an emergency service to set up a call between the emergency service and a user terminal, the received call setup request comprising a called party identifier;
determine whether the called party identifier is of a first type or of a second, different type, wherein the first type of called party identifier comprises a dialable number temporarily associated with the user terminal for use in receiving a call from the emergency service; and
in response to determining that the called party identifier is of the first type, transmit priority indication data to a further network function in the communication network in order to cause the further network function to prioritize handling of the call between the emergency service and the user terminal.

2. A network function according to clause 1, wherein the received call setup request does not comprise the priority indication data.

3. A network function according to clause 1 or 2, wherein the received call setup request is in accordance with a first protocol that does not allow the priority indication data to be comprised in the received call setup request.

4. A network function according to clause 3, wherein the first protocol is used to set up calls involving a public switched telephone network.

5. A network function according to clause 3 or 4, wherein the network function is configured to transmit a call setup request in accordance with a second, different protocol.

6. A network function according to clause 5, wherein the second protocol is a session initiation protocol.

7. A network function according to clause 5 or 6, wherein the transmitted call setup request comprises the called party identifier.

8. A network function according to any of clauses 5 to 7, wherein the transmitted call setup request comprises the priority indication data.

9. A network function according to any of clauses 1 to 8, wherein the network function comprises:
an internet protocol private branch exchange;
a signaling gateway;
a media gateway;
a media gateway control function;
an emergency call server;
a breakout gateway control function; and/or
a Point of Interface.

10. A network function according to any of clauses 1 to 9, wherein the network function does not comprise:
an emergency call session control function;
a proxy call session control function;
a serving call session control function; and/or
an interrogating call session control function.

11. A network function according to any of clauses 1 to 10, wherein the priority indication data is operable to cause the further network function, when prioritizing the handling of the call between the emergency service and the user terminal, to circumvent:
verifying an authentication state of the user terminal;
verifying an authorization state of the user terminal;
verifying a registration state of the user terminal;
verifying whether or not a supplementary service is configured for the user terminal; and/or
verifying credit and billing information associated with the user terminal.

12. A network function according to any of clauses 1 to 11, wherein the temporary association of the dialable number and the user terminal is on the basis of:
a time period;
an authorization state associated with the user terminal; and/or
an association between the user terminal and a radio access network.

13. A network function according to any of clauses 1 to 12, wherein the dialable number is from a pool of dialable numbers reserved for calls involving the emergency service.

14. A network function according to any of clauses 1 to 13, wherein the dialable number is from a pool of dialable numbers reserved for calls involving user terminals without credentials.

15. A network function according to any of clauses 1 to 14, wherein the dialable number is from a pool of dialable numbers reserved for calls involving user terminals with credentials.

16. A network function according to any of clauses 1 to 15, wherein, in response to determining that the called party identifier is of the second type, the network function is configured not to transmit the priority indication data in relation to the call.

17. A network function according to any of clauses 1 to 16, wherein the further network function comprises an emergency call session control function.

18. A network function according to any of clauses 1 to 17, wherein network function is configured to query a database on the basis of the called party identifier in order to determine whether the called party identifier is of the first type or of the second type.

19. A network function according to any of clauses 1 to 18, wherein the network function is configured to transmit data indicative of a geographical location associated with the user terminal for receipt by the emergency service in response to receipt of the call setup request by the network function.

20. A network function according to any of clauses 1 to 19, wherein the communications network comprises an IP Multimedia Subsystem (IMS) network.

21. A method of controlling a network function in a communications network, the method comprising, at the network function:
receiving a call setup request from an emergency service to set up a call between the emergency service and a user terminal, the received call setup request comprising a called party identifier;
determining whether the called party identifier is of a first type or of a second, different type, wherein the first type of called party identifier comprises a dialable number temporarily associated with the user terminal for use in receiving a call from the emergency service; and
in response to determining that the called party identifier is of the first type, transmitting priority indication data to a further network function in the communications network in order to cause the further network function to prioritize handling of the call between the emergency service and the user terminal.

22. A method according to clause 21, wherein the received call setup request does not comprise the priority indication data.

23. A method according to clause 21 or 22, wherein the received call setup request is in accordance with a first protocol that does not allow the priority indication data to be comprised in the received call setup request.

24. A method according to clause 23, wherein the first protocol is used to set up calls involving a public switched telephone network.

25. A method according to clause 23 or 24, wherein the method comprises transmitting a call setup request in accordance with a second, different protocol.

26. A method according to clause 25, wherein the second protocol is a session initiation protocol.

27. A method according to clause 25 or 26, wherein the transmitted call setup request comprises the called party identifier.

28. A method according to any of clauses 25 to 27, wherein the transmitted call setup request comprises the priority indication data.

29. A method according to any of clauses 21 to 28, wherein the priority indication data is operable to cause the further network function, when prioritizing the handling of the call between the emergency service and the user terminal, to circumvent:
verifying an authentication state of the user terminal;
verifying an authorization state of the user terminal;
verifying a registration state of the user terminal;
verifying whether or not a supplementary service is configured for the user terminal; and/or
verifying credit and billing information associated with the user terminal.

30. A method according to any of clauses 21 to 29, the method comprising causing the further network function or another further network function to maintain a temporary association between the called party number of the first type and the user terminal on the basis of:
a time period;
an authorization state associated with the user terminal; and/or
an association between the user terminal and a radio access network.

31. A method according to any of clauses 21 to 30, wherein the dialable number is from a pool of dialable numbers reserved for calls involving the emergency service.

32. A method according to any of clauses 21 to 31, wherein the dialable number is from a pool of dialable numbers reserved for calls involving user terminals without credentials.

33. A method according to any of clauses 21 to 32, wherein the dialable number is from a pool of dialable numbers reserved for calls involving user terminals with credentials.

34. A method according to any of clauses 21 to 33, wherein, in response to determining that the called party identifier is of the second type, the method comprises controlling the network function such that the network function does not transmit the priority indication data in relation to the call.

35. A method according to any of clauses 21 to 34, wherein the method comprises querying a database on the basis of the called party identifier in order to determine whether the called party identifier is of the first type or of the second type.

36. A method according to any of clauses 21 to 35, wherein the method comprises transmitting data indicative of a geographical location associated with the user terminal for receipt by the emergency service in response to receipt the call setup request.

37. A computer program comprising a set of instructions, which, when executed by a network function, cause the network function to perform a method in a communications network, the method comprising, at the network function:
receiving a call setup request from an emergency service to set up a call between the emergency service and a user terminal, the received call setup request comprising a called party identifier;
determining whether the called party identifier is of a first type or of a second, different type, wherein the first type of called party identifier comprises a dialable number temporarily associated with the user terminal for use in receiving a call from the emergency service; and
in response to determining that the called party identifier is of the first type, transmitting priority indication data to a further network function in the communications network in order to cause the further network function to prioritize handling of the call between the emergency service and the user terminal.

38. An emergency call session control function (E-CSCF), operable in a communications network, the E-CSCF being configured to:

receive priority indication data in relation to a call setup request, wherein the call setup request is from an emergency service to set up a call from the emergency service to a user terminal; and responsive to receipt of the priority indication data, prioritize handling of the call from the emergency service to the user terminal.

39. A method of controlling an emergency call session control function (E-CSCF), in a communications network, the method comprising:

receiving priority indication data in relation to a call setup request, wherein the call setup request is from an emergency service to set up a call from the emergency service to a user terminal; and responsive to receipt of the priority indication data, prioritizing handling of the call from the emergency service to the user terminal.

40. A network function in a communications network configured to:

receive call setup signaling from an emergency service, the call setup signaling comprising a called party identifier;

determine at least in part based on the called party identifier whether the received call setup signaling relates to a call from the emergency service to the user terminal; and based on the determination, selectively including priority indication data in outgoing call setup signaling in relation to the call, whereby to cause the call to be prioritized in the communications network.

41. A communications network configured to:

receive call setup signaling from an emergency service, the call setup signaling comprising a called party identifier;

determine at least in part based on the called party identifier whether the received call setup signaling relates to an emergency call; and prioritize handling of the call based at least in part on the determination.

42. A method of controlling a SIP gateway, the method comprising:

receive call setup signaling from an emergency service, the call setup signaling comprising a called party identifier;

determine whether the received call setup signaling is an emergency or a non- emergency call at least in part on the basis of the called party identifier; and prioritize handling of the call based at least in part on the determination.

43. A method of controlling an emergency call session control function (E-CSCF), in a communications network, the method comprising:

receiving a session initiation protocol (SIP), invite message to set up a call between a user terminal and an emergency service, the SIP invite message comprising data identifying the call as a callback from the emergency service; and prioritizing handling of the call between the emergency service and the user terminal responsive to receipt of the SIP invite message.

44. An emergency call session control function (E-CSCF), operable in a communications network, the E-CSCF being configured to:

receive a session initiation protocol (SIP), invite message to set up a call between a user terminal and an emergency service, the SIP invite message comprising data identifying the call as a callback from the emergency service; and prioritize handling of the call between the emergency service and the user terminal responsive to receipt of the SIP invite message.

What is claimed is:

1. A gateway operable in an IP Multimedia Subsystem (IMS) network, the gateway being configured to:

receive a first call setup request to set up a first call, the first call setup request being received from an emergency service, the first call being between the emergency service and a user terminal, the received first call setup request comprising a first called party identifier;

determine whether the called party identifier is of a first type or of a second, different type, wherein the first type of called party identifier comprises a dialable number temporarily allocated to the user terminal for use in receiving a call from the emergency service, wherein the dialable number is from a pool of dialable numbers reserved for emergency calls involving the emergency service;

in response to determining that the first called party identifier is of the first type, transmit priority indication data to a Call Session Control Function (CSCF) in the IMS network in order to cause the CSCF to prioritize handling of the first call between the emergency service and the user terminal;

receive a second call setup request to set up a second call, the second call setup request comprising a second, different, called party identifier;

determine whether the second called party identifier is of the first type or of the second type, wherein the second type of called party identifier does not comprise a dialable number temporarily allocated for use in receiving a call from the emergency service; and not transmit the priority indication data in relation to the second call in response to determining that the second called party identifier is of the second type.

2. The gateway of claim 1, wherein the received first call setup request does not comprise the priority indication data.

3. The gateway of claim 1, wherein the received first call setup request is in accordance with a first protocol that does not allow the priority indication data to be comprised in the received first call setup request.

4. The gateway of claim 3, wherein the first protocol is used to set up calls involving a public switched telephone network.

5. The gateway of claim 3, wherein the gateway is configured to transmit a third call setup request in accordance with a second, different protocol.

6. The gateway of claim 5, wherein the second protocol is a session initiation protocol.

7. The gateway of claim 5, wherein the transmitted third call setup request comprises the first called party identifier.

8. The gateway of claim 5, wherein the transmitted third call setup request comprises the priority indication data.

9. The gateway of claim 1, wherein the gateway comprises:

an internet protocol private branch exchange;
a signaling gateway;
a media gateway;
a media gateway control function;
an emergency call server;
a breakout gateway control function; and/or
a Point of Interface.

10. The gateway of claim 1, wherein the gateway does not comprise:

an emergency call session control function;
a proxy call session control function;
a serving call session control function; and/or
an interrogating call session control function.

11. The gateway of claim 1, wherein the priority indication data is operable to cause the CSCF, when prioritizing the handling of the call between the emergency service and the user terminal, to circumvent:
  verifying an authentication state of the user terminal;
  verifying an authorization state of the user terminal;
  verifying a registration state of the user terminal;
  verifying whether or not a supplementary service is configured for the user terminal; and/or
  verifying credit and billing information associated with the user terminal.

12. The gateway of claim 1, wherein the temporary association of the dialable number and the user terminal is on the basis of:
  a time period;
  an authorization state associated with the user terminal; and/or
  an association between the user terminal and a radio access network.

13. The gateway of claim 1, wherein the dialable number is from a pool of dialable numbers reserved for calls involving user terminals without credentials.

14. The gateway of claim 1, wherein the dialable number is from a pool of dialable numbers reserved for calls involving user terminals with credentials.

15. The gateway of claim 1, wherein the CSCF comprises an emergency CSCF.

16. A method of controlling a gateway in an IP Multimedia Subsystem (IMS) network, the method comprising, at the gateway:
  receiving a first call setup request to set up a first call, the first call setup request being received from an emergency service, the first call being between the emergency service and a user terminal, the received first call setup request comprising a first called party identifier;
  determining whether the called party identifier is of a first type or of a second, different type, wherein the first type of called party identifier comprises a dialable number temporarily allocated to the user terminal for use in receiving a call from the emergency service, wherein the dialable number is from a pool of dialable numbers reserved for emergency calls involving the emergency service;
  in response to determining that the first called party identifier is of the first type, transmitting priority indication data to a Call Session Control Function (CSCF) in the IMS network in order to cause the CSCF to prioritize handling of the first call between the emergency service and the user terminal;
  receiving a second call setup request to set up a second call, the second call setup request comprising a second, different, called party identifier;
  determine whether the second called party identifier is of the first type or of the second type, wherein the second type of called party identifier does not comprise a dialable number temporarily allocated for use in receiving a call from the emergency service; and
  not transmitting the priority indication data in relation to the second call in response to determining that the second called party identifier is of the second type.

17. A non-transitory computer-readable storage medium comprising a set of computer-readable instructions stored thereon, which, when executed by a gateway, cause the gateway to perform a method in an IP Multimedia Subsystem (IMS) network, the method comprising, at the gateway:
  receiving a first call setup request to set up a first call, the first call setup request being received from an emergency service, the first call being between the emergency service and a user terminal, the received first call setup request comprising a first called party identifier;
  determining whether the called party identifier is of a first type or of a second, different type, wherein the first type of called party identifier comprises a dialable number temporarily allocated to the user terminal for use in receiving a call from the emergency service, wherein the dialable number is from a pool of dialable numbers reserved for emergency calls involving the emergency service;
  in response to determining that the first called party identifier is of the first type, transmitting priority indication data to a Call Session Control Function (CSCF) in the IMS network in order to cause the CSCF to prioritize handling of the first call between the emergency service and the user terminal;
  receiving a second call setup request to set up a second call, the second call setup request comprising a second, different, called party identifier;
  determine whether the second called party identifier is of the first type or of the second type, wherein the second type of called party identifier does not comprise a dialable number temporarily allocated for use in receiving a call from the emergency service; and
  not transmitting the priority indication data in relation to the second call in response to determining that the second called party identifier is of the second type.

* * * * *